United States Patent [19]

Melcher et al.

[11] 4,103,750

[45] Aug. 1, 1978

[54] METHOD OF AND CIRCUIT FOR FORMING SIGNALS FOR DAMPING CONTROL OF AN ELECTRICAL MEASURED-VALUE INDICATOR

[75] Inventors: Franz Josef Melcher, Ellierode; Christian Oldendorf, Göttingen, both of Fed. Rep. of Germany

[73] Assignee: Sartorius-Werke GmbH (und vorm. Göttinger Präzisionswaagenfabrik GmbH), Göttingen, Fed. Rep. of Germany

[21] Appl. No.: 758,852

[22] Filed: Jan. 12, 1977

[30] Foreign Application Priority Data

Jan. 14, 1976 [DE] Fed. Rep. of Germany ....... 2601150

[51] Int. Cl.² ............................................ G01G 23/10
[52] U.S. Cl. ...................................... 177/1; 177/185; 177/210 EM
[58] Field of Search ................ 177/185, 212, 210 EM, 177/210 FD, 210 C, 210 R, 1, 50

[56] References Cited

U.S. PATENT DOCUMENTS 3,789,937 2/1974 Strobel ...................... 177/210 EM
3,802,522 4/1974 Thompson ...................... 177/212 X

*Primary Examiner*—Joseph W. Hartary
*Attorney, Agent, or Firm*—Browdy & Neimark

[57] ABSTRACT

A method of producing signals for a damping control of an electric measured-value indicator, especially an electromagnetic precision balance, having an active filter or impedance transformer located in a branch which filters out the a.c. voltage is disclosed. Transient signals in the form of a.c. voltages with different frequencies are applied to the output of the active filter or transformer in the noise range. Sequentially tapped values of the a.c. voltages are compared in the noise range with previous values. A circuit for producing signals for a damping control of an electric measured-value indicator includes a comparator connected with the low ohmage output of a filter or impedance transformer. The comparator is provided with a switchable voltage storage device to which a differentiating element and an amplifier are connected. When a.c. voltages in the noise range are applied, these voltages can be differentiated, amplified, and if necessary rectified and filtered out at the circuit output for subsequent damping evaluation.

15 Claims, 3 Drawing Figures

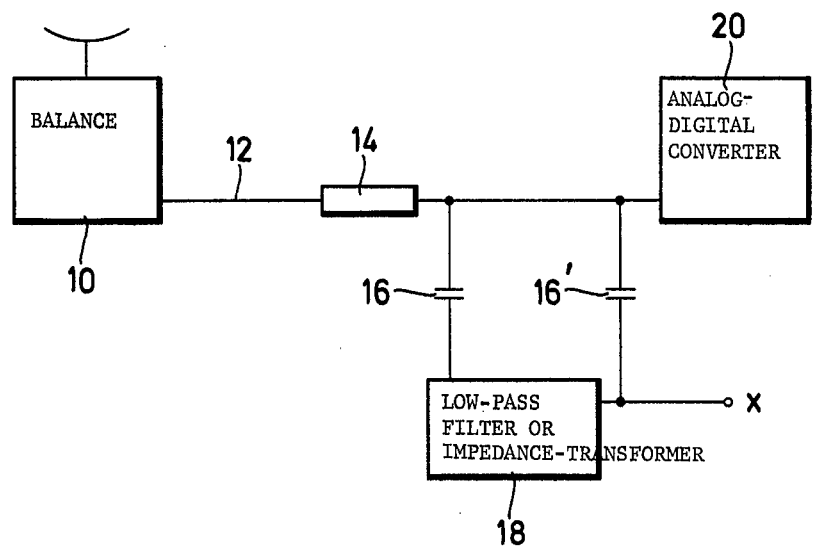
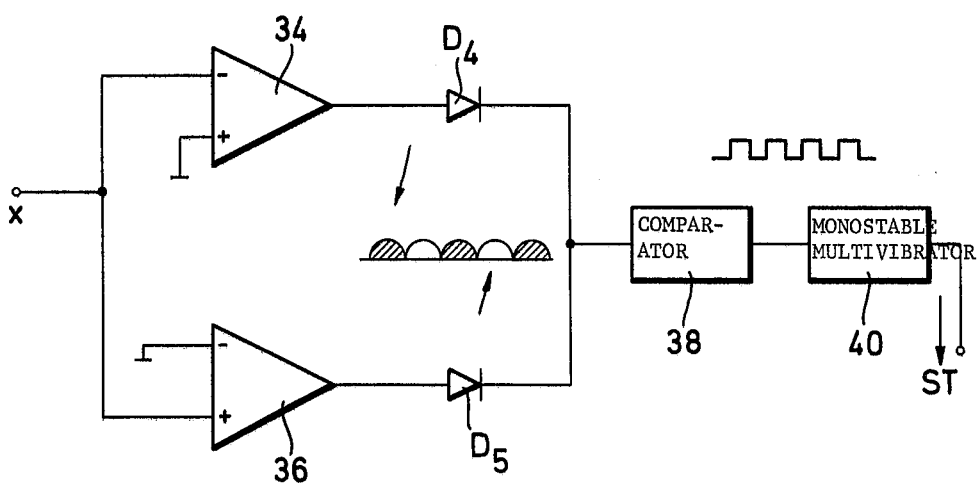

METHOD OF AND CIRCUIT FOR FORMING SIGNALS FOR DAMPING CONTROL OF AN ELECTRICAL MEASURED-VALUE INDICATOR

BACKGROUND OF THE INVENTION

This invention relates to a method of and a circuit which forms signals for a damping control of a measured-value indicator. The present invention relates more particularly to such a method and circuit which forms signals for the damping control of an electromagnetic precision balance, having an active filter inserted in a branch which filters out the a.c. voltages or an impedance transformer, at whose output noise signals in the form of a.c. voltages in the noise range are applied with different frequencies. The term "precision balances" used herein also includes all types of analytical balances and microbalances.

An electric balance with a measuring device and a counting device, which supplies a digital measurement result periodically, is known. In addition, this known electric balance is also provided with an adjustable comparator, wherein the measured signals from the balance are compared when it is in the resting position with preset limiting values in such manner that a digitalized measurement result is displayed in the display unit and/or transmitted to the latter only when this boundary value is not reached or exceeded for at least the duration of one measurement period. Since this measurement period in this known circuit must be made rather long for safety reasons, a relatively long interval elapses until a required measurement result can be obtained. Moreover, this circuit also has a relatively large cost factor in terms of circuit components; see German Offenlegungsschrift No. 2,323,200.

SUMMARY OF THE INVENTION

The principal object of the present invention is to provide a method and a circuit of the type initially described above, wherein a usable signal for a damping evaluation is produced in a relatively short time, preferably in a very short time.

According to the invention in its method aspect, it is provided that sequentially sampled values from the a.c. noise voltages are compared with preset values. In addition, in a circuit for accomplishing the method according to the present invention, provision is made for connecting a comparator to the low-resistance output of a filter or impedance transformer, the comparator including a switchable voltage storage device, to which a differentiating element and an amplifier are connected, so that when a.c. voltages in the noise range are applied, the latter are differentiated, amplified, and if necessary rectified, and filtered out at the circuit output for subsequent damping evaluation.

Advantageously, the voltage storage device consists of capacitors, which can be switched by a switch alternately and in succession to the capacitor of the differentiating element. The capacitor of the differentiating element can be connected directly via the switch with either one of the capacitors in the voltage storage device. Preferably, this voltage storage device can be switched by means of digital signals, for example signals supplied by an analog-digital converter; in this context, the circuit elements as well as the digital measurement frequency are dimensioned so that a nearly integral behavior can be achieved.

Advantageously, the measurement frequency is much higher than the frequencies of the a.c. voltages in the noise range; in fact, the measurement frequency is at least twice as high, and is advantageously five times higher, and preferably ten times higher than the frequencies of the a.c. voltages which are in the noise range.

Furthermore, an additional circuit is provided for carrying out the method described at the outset according to the invention, wherein a comparator with an adjustable set amplitude monitoring is connected to the low-ohmage output of the filter or the impedance transformer. Advantageously, a monostable multivibrator is connected to this comparator, said multivibrator being reset if the noise signal exceeds the amplitude setting of the comparator.

The circuit just described is arranged so that one measurement step lasts 500 milliseconds, so that, since values sampled sequentially in the comparator are compared with one another, at least two measured values, i.e., 1 sec, must be awaited until a signal can be transmitted for damping evaluation and a value appears on a display connected with the balance. However, if the measured-value indicator has not yet been damped at the beginning of the first measurement step, the minimum measurement time is prolonged, i.e., the earliest time after which a damping signal can be given and an indicated value can appear, is prolonged by an additional two measurement steps, i.e., by one more second.

In contrast to the aforementioned arrangement, the circuit described above, wherein a switchable voltage storage device is connected to a differentiating element, can carry out 200 measurements per second; i.e., one measurement step now lasts 5 msec.

However, this means that when, as in the example given above, the measured-value indicator has come to rest during the first measurement step, no voltage differences will appear during the third and fourth measurement steps and therefore not after the fourth measurement step, i.e., after only 20 msec and not after 2000 msec, a signal is supplied for damping evaluation and a measured value can therefore be obtained and displayed. In the selected example, using the first circuit, which has the voltage storage device and the differentiating element in it, an improvement by a factor of 100 is achieved over the second circuit described, wherein an amplitude comparison is carried out.

By using this circuit, therefore, it is possible to determine much more quickly when the measured value indicator has been damped, and a reading can be obtained correspondingly sooner. Comprehensive studies have shown that by using the circuit which is provided with a voltage divider and a differentiated element, in comparison to the other circuit, wherein amplitude comparison is carried out, an improvement of at least 40% on the average has been achieved. It was discovered in the course of these studies that the frequencies of the a.c. voltages which create the noise and influence the results are a maximum of 10–15 Hz. The gain in time which can be achieved with this circuit, in which 200 measurements per second can be carried out in contrast to the known circuit described at the outset, is considerable, and is much higher than 40% on the average.

BRIEF DESCRIPTION OF THE DRAWINGS

FIG. 1 is a schematic, partially block diagram of a measured-value indicator in the form of a balance con FIG. 3 is a schematic, partially block diagram of a further preferred embodiment of the present invention, which can be used as a vibration detector.

DETAILED DESCRIPTION OF THE PREFERRED EMBODIMENTS

Figure 2:
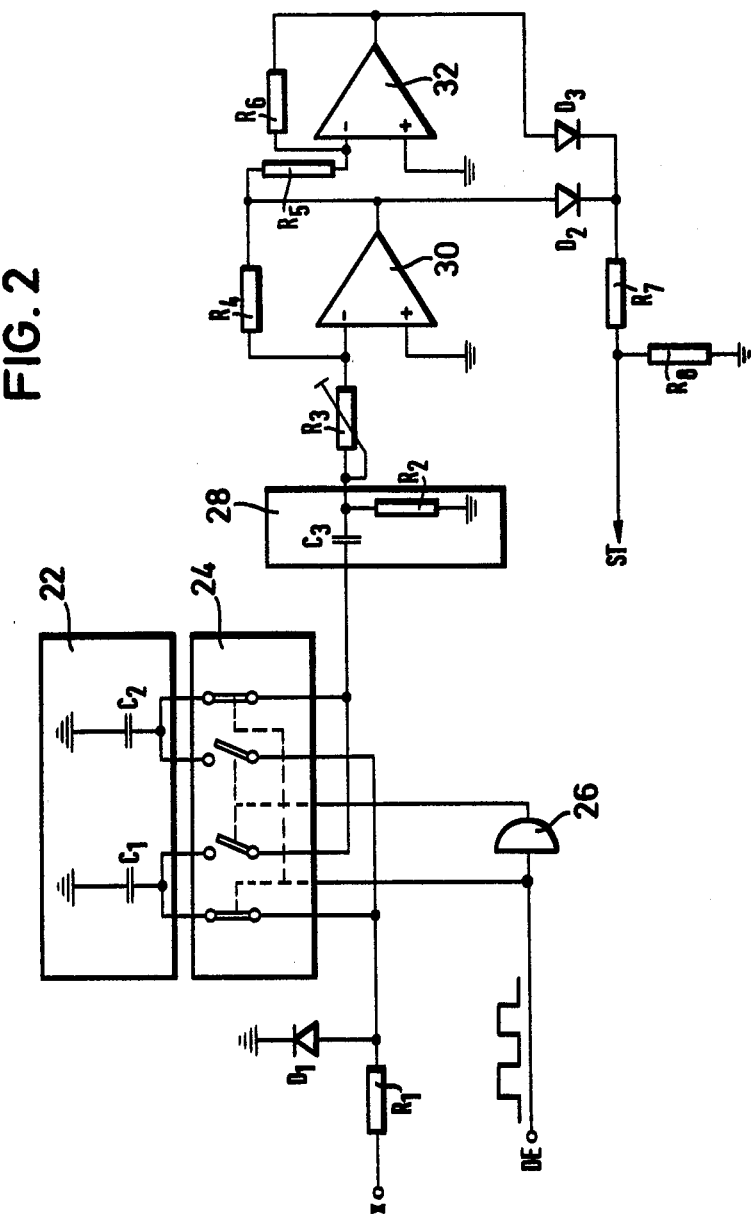
- FIG. 2 is a schematic, partially block diagram of an advantageous embodiment of the present invention.

FIG. 1 shows a measured-value indicator which includes a balance 10, which is connected for example with an analog-digital converter 20 via an output line 12 and a fixed resistance 14. Beyond the fixed resistance 14, by means of a capacitor 16 and a capacitor 16', a.c. voltages in the noise range can be capacitance-filtered from the line 12, whereby only minimum energy is removed from the measured signal in the line 12. The filtered a.c. voltages are fed, for example, to an input of a low-pass filter or impedance transformer 18 via the capacitor 16 and to its output via a capacitor 16' and thus effectively damped. The low-pass filter or impedance transformer can be used as alternatives to one another. The damped a.c. voltages are then fed to the low impedance output $x$ of the filter 18 or the corresponding output $x$ of the impedance transformer 18.

FIG. 2 shows a first advantageous embodiment of the circuit according to the invention, at whose first input $x$ the output signals from the low-pass filter having a low impedance output or impedance transformer 18 (FIG. 1) are applied. These a.c. voltages are then fed via a resistor $R_1$ and a schematically represented switch 24 to a voltage storage device 22, provided with two capacitors $C_1$ and $C_2$. At a second input DE of the circuit, graphically represented digital pulses are applied to the switch 24 directly and via an inverter 26 with a frequency of for example 200 Hz, i.e. one pulse lasts 5 msec. A differentiating circuit 28 is connected to the schematically represented switch 24 and hence to the voltage storage device 22 in such manner that a capacitor $C_3$ of the differentiating circuit 28 is directly connected to the switch 24 and consequently, depending on the position of the switch 24, directly with one of the two capacitors $C_1$ and $C_2$ of the voltage storage device 22. An amplifier 30 is connected to the differentiating circuit 28 via an adjustable resistor $R_3$, the output of the amplifier 30 being connected via a diode $D_2$ and a resistor $R_7$ with the output ST which is used for damping evaluation. In order to allow evaluation and use of both positive and negative differentiating pulses, there is an inverter 32 connected to the output of the amplifier 30, and whose output is similarly connected via a diode $D_3$ and the resistor $R_7$ with the output ST which is used for damping evaluation. The output of the amplifier 30 as well as the output of the inverter 32 are conventionally connected via a respective resistor $R_4$ or $R_6$ to the corresponding input (feedback). In addition, a diode $D_1$ is provided between input resistor $R_1$ and ground, a resistor $R_5$ is provided between amplifier 30 and inverter 32, and an additional resistor $R_8$ is provided between the output resistor $R_7$ and ground.

When a.c. voltages in the noise range are applied, one of the two capacitors $C_1$ or $C_2$ of the voltage storage device 22 is charged in this circuit, controlled by the digital pulses fed to the second input DE, depending on the position of the switch 24. This is therefore a so-called sample-and-hold circuit. Each digital pulse applied to the second input DE is therefore used to switch the switch 24 from one capacitor to the other. Depending on the position of the switch 24, half of the charge of one of the two capacitors $C_1$ or $C_2$ of the voltage divider is discharged into the capacitor $C_3$ of the differentiating circuit 28 so that the two capacitors $C_1$, $C_2$, connected directly together by the switch 24, and the capacitor $C_3$ are charged to the same voltage level.

If voltage differences in the analog signal appear between two directly sequential digital pulses at circuit first input $x$, these voltage differences are differentiated by differentiating circuit element 28 and amplified in the amplifier 30. Depending on whether a positive or negative differentiating pulse is involved, they are either filtered out directly via the diode $D_2$ or via the resistor $R_5$, the inverter 32 and the diode $D_3$ connected to the latter and then fed, via the resistor $R_7$, to the output ST which is used for damping evaluation. As soon as no voltage differences appear any longer in two immediately sequential digital pulses at the first input $x$, an indication is given that damping or the required settling of the balance has been achieved. Since it is possible to use the circuit shown in FIG. 2 without additional digital pulses at a frequency of 200 Hz, only four measurement steps, i.e., 20 msec will suffice after the last voltage differential has been determined to give a reading on the display. Advantageously, in the circuit shown in FIG. 2, the input resistor $R_1$ and the two capacitors $C_1$ and $C_2$ of the voltage storage device 22 as well as the control frequency applied to the second input DE are dimensioned so that integral behavior can be achieved, similar to that of the analog-digital converter 20 (FIG. 1).

FIG. 3 illustrates an additional drift-free operating circuit which can be used in particular in conjunction with the active low-pass filter 18 (FIG. 1) as an analog vibration detector for balances according to the present invention. Here the circuit is again connected to the output $x$ of the active low-pass filter 18 (FIG. 1). The voltages tapped off at the output $x$ are proportional to the a.c. voltages which are in the noise range and are superimposed on the measurement voltage, and can therefore be used as a vibration criterion for the measured-value indicator, for example the balance 10 (FIG. 1).

Each half-wave of the noise voltages tapped off at the output $x$ is amplified by amplifiers 34 and 36 and then rectified respectively by diodes $D_4$ and $D_5$, whereby the half-waves shown graphically in FIG. 3 are obtained. The amplified and rectified noise voltages are then compared in a conventional comparator 38 with a given amplitude setting provided within the comparator 38.

As soon as the amplified and rectified noise voltages exceed the set amplitude and hence the threshold of the comparator 38, a monostable multivibrator 40, connected to the comparator 38, is reset and a delay equal to its delay time is introduced. This sequence, namely, the one in which the monostable multivibrator 40 receives a signal from the comparator 38 and results in its output being correspondingly delayed, as soon as the noise signal exceeds the threshold of comparator 38, is repeated until the noise voltages at tapping point $x$, i.e., the noise voltages in the output signal of the balance 10, have been smoothed out to the point where the threshold of the comparator 38 is no longer exceeded.

The damping or significant settling of the measured-value indicator in the form of the balance 10 is then achieved when the comparator 38 has no longer responded for a specified fixed period of time, for example two measurement steps of 500 sec each, i.e., one second.

With the aid of the amplitude monitoring which is carried out in the comparator 38 or the comparison of a set amplitude with the amplitude of the tapped noise voltage, it is possible with relatively low circuit expense to provide a vibration detector for the balance 10 at whose output ST a damping signal will be supplied only when the balance 10 has achieved immobilization or the necessary degree of damping.

The cost of the circuit required for use as a vibration detector is low because the output signal from the active low-pass filter 18 appears across a low impedance circuit; an impedance transformer can therefore be eliminated in this case.

It is to be understood that the embodiments of the present invention described above and illustrated in the drawings have been provided by way of example, not by way of limitation. Various other embodiments and numerous variants are possible within the spirit and scope of the invention, its scope being defined in the appended claims.

What is claimed is:

1. In a method for producing signals for monitoring the resting or equilibrium position of an electromagnetic precision balance which includes a branch for coupling out a.c. voltages and an active filter or impedance transformer, at the output of which a.c. voltages in a noise range having different frequencies appear, the improvement comprising integrating the a.c. voltages coupled out in respectively equal time intervals to provide at least two integrals, and determining the difference between two of said integrals following one another as a measurement for monitoring the rest or equilibrium position of the balance.

2. In a circuit for producing signals for monitoring the resting or equilibrium position of an electromagnetic precision balance and which includes a branch for coupling out a.c. voltages and an active filter or impedance transformer, at the output of which a.c. voltages in a noise range having different frequencies appear, the improvement comprising a pair of capacitors, means for alternatively charging said capacitors to integrate the a.c. voltages in respectively equal time intervals, and a comparator coupled to said capacitors for comparing the charge voltages of said capacitors as measurement for monitoring the rest or equilibrium position of the balance.

3. An improved circuit according to claim 2, including means for alternatively switching said capacitors to said comparator.

4. An improved circuit according to claim 3, wherein said comparator comprises a differentiating circuit including a third capacitor.

5. An improved circuit according to claim 4, wherein said pair of capacitors are alternatively directly connected in series with said third capacitor, which forms part of said comparaotr.

6. A circuit according to claim 4, including switching means responsive to digital signals for alternatively switching respective ones of said pair of capacitors in series with said differentiating circuit.

7. An improved circuit according to claim 6, including an analog-to-digital converter for supplying the digital signals.

8. An improved circuit according to claim 2, including a resistor connected between a low impedance output and said pair of capacitors.

9. An improved circuit according to claim 8, including a digital signal source, and wherein said pair of capacitors, said resistor and the frequency of said digital signal source effect integral behavior.

10. An improved circuit according to claim 9, wherein said digital signal source is a source providing digital signals having a frequency essentially higher than frequencies of the a.c. voltages in the noise range.

11. An improved circuit according to claim 10, wherein said source provides a signal having a frequency at least twice the frequencies of the a.c. voltages in the noise range.

12. An improved circuit according to claim 10, wherein said source provides a signal having a frequency five times as high as the frequencies of the a.c. voltages in the noise range.

13. An improved circuit according to claim 10, wherein said source provides a signal having a frequency ten times as high as the frequencies of the a.c. voltages in the noise range.

14. In a circuit for producing signals for monitoring the resting or equilibrium position of an electromagnetic precision balance and which includes a branch coupling out a.c. voltages, and an active filter or impedance transformer, at the output of which a.c. voltages in a noise range having different frequencies appear, the improvement comprising a comparator having an adjustable amplitude threshold coupled to a low impedance output of said filter or said impedance transformer for monitoring the amplitude, a monostable multivibrator connected to said comparator, said monostable multivibrator being reset when the a.c. voltages in the noise range exceed a given amplitude.

15. An improved circuit according to claim 14, including a pair of rectifiers and a pair of amplifiers, each said amplifier being connected in series with a respective one of said rectifiers between said low impedance output and said comparator to supply full wave rectified a.c. voltage signals in the noise range to said comparator.

* * * * *